US 6,639,666 B2

(12) United States Patent  
Li (10) Patent No.: US 6,639,666 B2
(45) Date of Patent: Oct. 28, 2003

(54) SYSTEM AND METHOD FOR OPTICAL SPECTRUM FAST PEAK REPORTING

(75) Inventor: Yu Li, Newton, MA (US)

(73) Assignee: Axsun Technologies, Inc., Billerica, MA (US)

( * ) Notice: Subject to any disclaimer, the term of this patent is extended or adjusted under 35 U.S.C. 154(b) by 119 days.

(21) Appl. No.: 10/005,712

(22) Filed: Nov. 8, 2001

(65) Prior Publication Data

US 2003/0098974 A1 May 29, 2003

(51) Int. Cl.[7] ................................................ G01J 3/00
(52) U.S. Cl. ...................................................... 356/300
(58) Field of Search ........................................ 356/300

(56) References Cited

U.S. PATENT DOCUMENTS 5,177,560 A * 1/1993 Stimple et al. ............. 356/308
5,792,947 A * 8/1998 Pogrebinsky et al. ......... 73/105

* cited by examiner

Primary Examiner—F. L. Evans
Assistant Examiner—Kara Geisel
(74) Attorney, Agent, or Firm—J. Grant Houston (57) ABSTRACT

A system and method for fast peak finding in an optical spectrum prioritizes the information it first generates and how the information is then forwarded from the system to a host computer, for example. A spectrum detection subsystem generates a spectrum of an optical signal. An analog-to-digital converter converts the spectrum into sample data. Finally, a data processing subsystem first detects the spectral locations of peaks in the spectrum using the sample data and then uploads the peak information to a host computer before performing processing to determine the shapes of the peaks and/or noise information for the optical signal, for example. The system is thus able to quickly find some information, such as whether or not channels or carriers are present, at what frequency the carriers are operating, and the carriers' power level, and send this information to the host computer. In contrast, information concerning spectral shape or the noise floor is sent later in time.

20 Claims, 7 Drawing Sheets

SYSTEM AND METHOD FOR OPTICAL SPECTRUM FAST PEAK REPORTING

BACKGROUND OF THE INVENTION

Wavelength division multiplexing (WDM) systems typically comprise multiple, separately modulated, optical carrier signals, each one being assigned to a different channel slot, or frequency, in the WDM signal. The sources for the carriers can be located at a single head-end in long-haul applications or remote from each other, with the channels typically being accumulated onto a single fiber by multiplexers, in metro area network applications, for example. Along the fiber transmission link, the carriers can be regenerated or collectively amplified typically by gain fiber, semiconductor optical amplifiers (SOA), or doped waveguide devices. At the link termination, the carriers are usually demodulated or separately routed to new links.

Spectral information is required to confirm the proper operation of WDM systems. Generally, the types of information required are different depending on the type of system. Long haul systems are many times concerned with information such as the spectral shape of the channels and optical noise level. Optical signal to noise ratio (OSNR) is a common metric that is required by these systems. The spectral information is used to control the amplifiers and possibly correct for any gain tilt. Networks that possibly include add-drop or cross-connect devices are typically interested in channel slot occupancy information, i.e., whether or not a carrier signal is present in a given channel slot. They also typically monitor whether or not specific carriers are located to their assigned channel slot frequency and/or whether or not they are operating at the correct power level.

SUMMARY OF THE INVENTION

The speed at which the WDM systems require spectral information is different. Confirmation of correct channel routing, fault recovery, and excessive channel power must sometimes be detected quickly. Preferably, a fault, for example, should be detected in a few milliseconds or less. In contrast, noise floor information and the channel spectral shape typically change much more slowly. As a result, some long haul WDM systems can wait for over a second to obtain some types of information.

The present invention is directed to a system and method for fast peak finding in an optical spectrum. The system is capable of prioritizing the information it first generates and how the information is then forwarded to a network controller, such as a host computer. It is able to very quickly find some information, such as whether or not channels or carriers are present, at what frequency the carriers are operating, and the carriers' power level and send this information to the host computer. In contrast, information concerning spectral shape or the noise floor is sent later in time.

In general, according to one aspect, the invention features an optical spectrum monitoring system. It comprises a spectrum detection subsystem for generating a spectrum of an optical signal. An analog-to-digital converter converts the spectrum into sample data. A data processing subsystem first detects the spectral locations of peaks in the spectrum using the sample data and then uploads the peak information to a host computer before completing processing to determine the shapes of the peaks and/or noise information for the optical signal, for example.

In the current embodiment, the spectrum detection subsystem comprises a microelectromechanical system (MEMS) tunable filter. A reference source is sometimes provided for calibrating the spectrum detection subsystem.

Also, according to the present embodiment, the data processing subsystem uploads the sample data to the host computer before uploading the peak information to the host computer. Further, to facilitate fast peak detection, the data processing subsystem begins detecting the spectral locations of the peaks even before the completion of the conversion of the spectrum into the sample data, i.e., the scan is completed.

According to the present implementation, the data processing subsystem comprises a processor that includes a processor core and at least two blocks of processor memory. A system memory is also provided. The blocks of processor memory are used as a "ping-pong" buffer to transfer data from an analog-to-digital converter to the system memory.

In order to enable the beginning of the processing of the sample data, even while the sample data are being collected, direct memory addressing is used to transfer the sample data from the processor memory to the system memory, thereby allowing the processor core to calculate the peak information. Additionally, the processing subsystem also generates calibrated sample data from the sample data in response to calibration information and then uploads the calibrated sample data to the host computer. Preferably, also, the data processing subsystem deconvolves a filter transfer function from the spectrum of the sample data to generate a corrected spectrum.

In general, according to another aspect, the invention also features a method for processing spectrum data in an optical spectrum monitoring system. This method comprises detecting a spectrum of an optical signal and converting the spectrum into sample data. The spectral locations of peaks in the sample data are then detected. This peak information is uploaded to a host computer. Finally, after at least beginning the step of uploading the peak information, the shapes of the peaks and/or noise information are determined for the optical signal.

In the preferred embodiment, sample data are uploaded to the host computer before the peak information is uploaded. The step of detecting the spectral locations of the peaks is started before completion of the step of converting the spectrum into sample data.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

Figure 1:
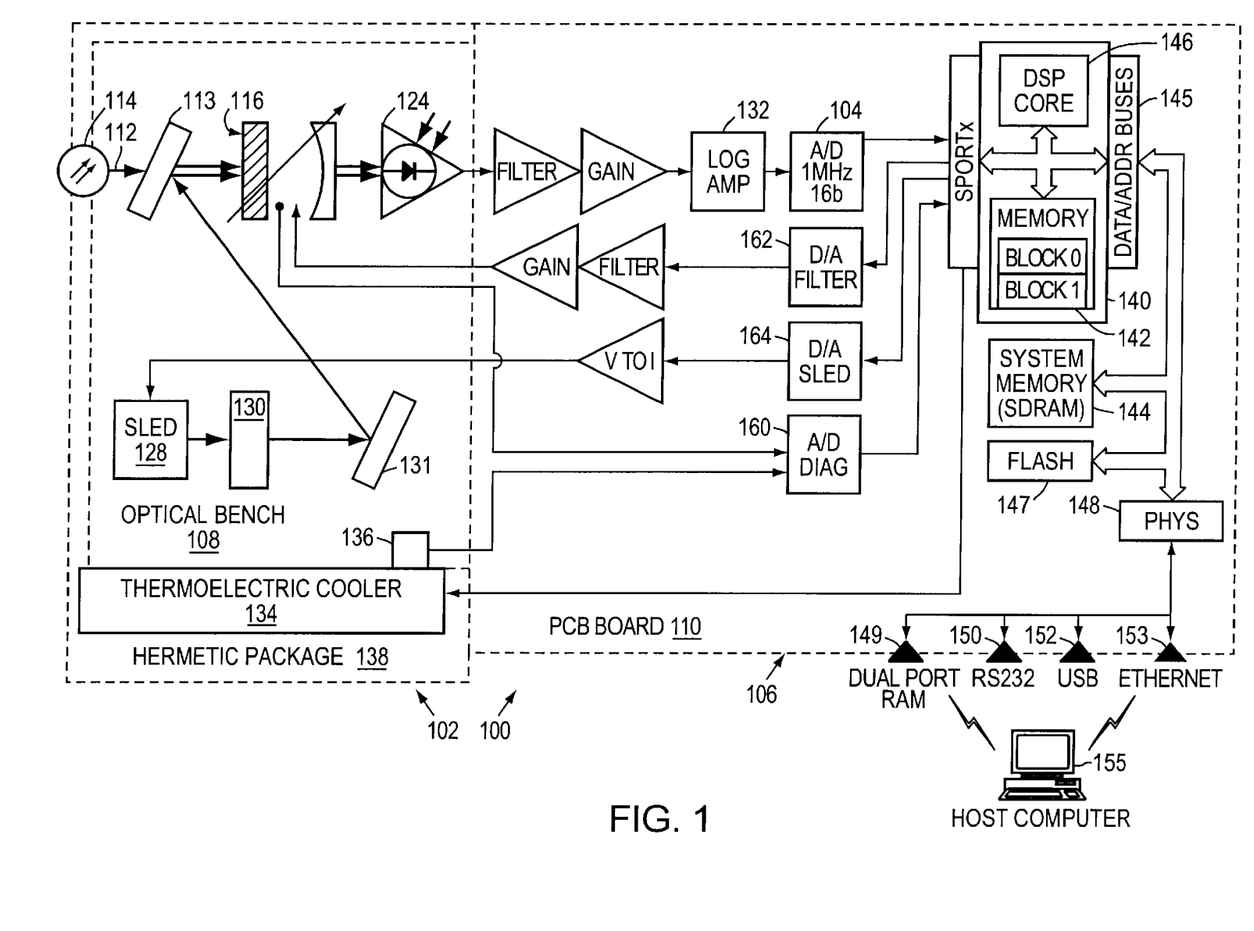
FIG. 1 is a schematic of the optical train and a block diagram of the electronics of an optical spectrum monitoring system of the present invention.

FIG. 1 shows an optical spectrum monitoring system 100, which has been constructed according to the principles of the present invention.

In more detail, the system 100 generally comprises a spectrum detection subsystem 102, an analog to digital converter 104, and a data processing subsystem 106. Generally, the spectrum detection subsystem 102 is assembled on a substrate or optical bench 108; and the data processing subsystem 106 is interconnected on a printed circuit board 110, in a current implementation.

In the illustrated example, the spectrum detection subsystem 102 is a microelectromechanical system (MEMS) implementation. Specifically, an input optical signal 112, which is supplied by an optical fiber 114 for example, is received onto the optical bench 108 and transmitted to a MEMS tunable filter 116, typically through collimation, focusing optics if required.

In other embodiments, fiber grating-based systems are used in place of the MEMS filter 116.

Figure 2:
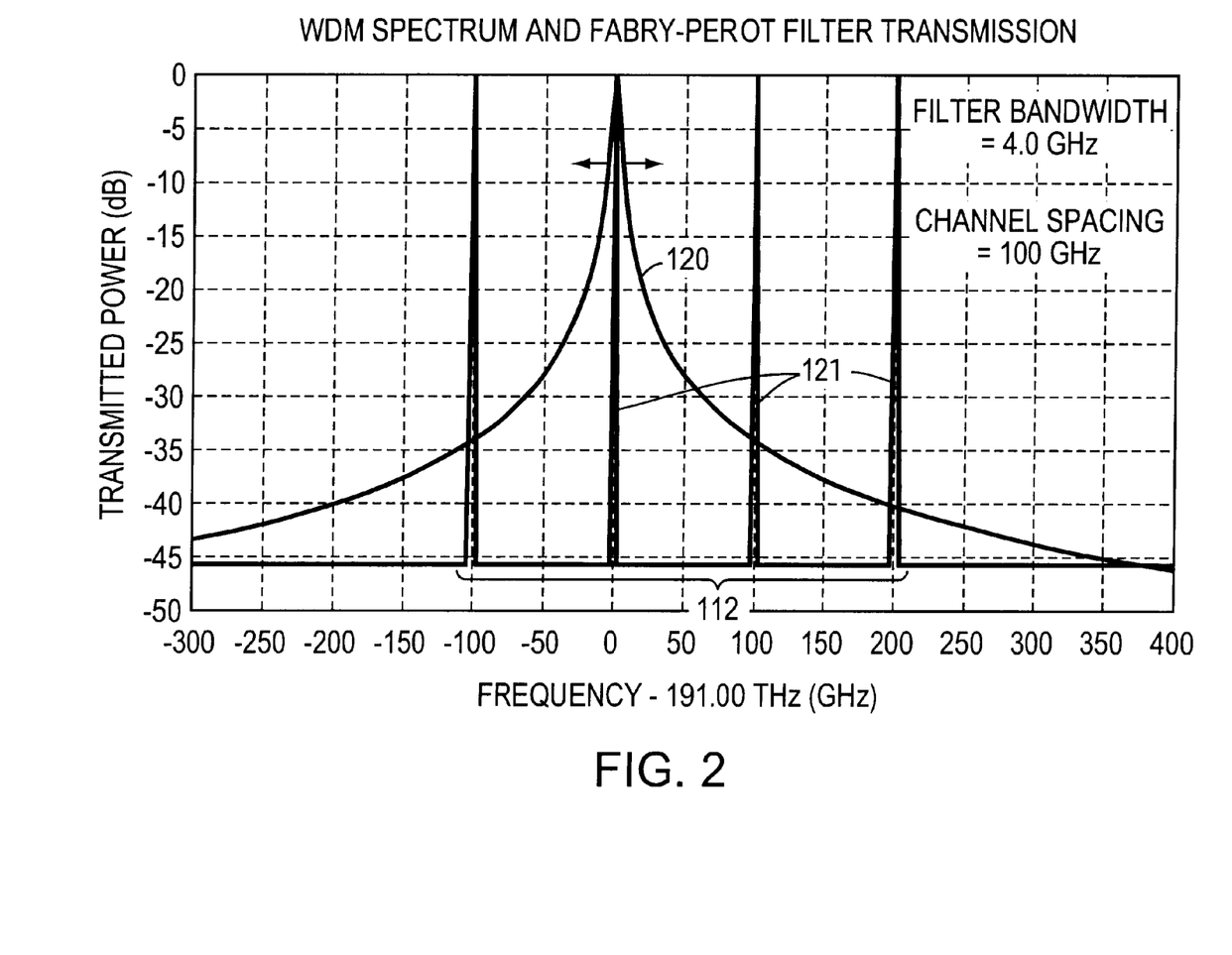
FIG. 2 is a plot of transmission and power in decibels (dB) as a function of frequency showing an exemplary WDM signal and the filter passband.

FIG. 2 illustrates an exemplary spectral relationship between the input optical signal 112 and the tunable filter's passband 120. Spectrally, the tunable filter 116 has a generally Lorentzian, or more specifically an Airy, function spectral characteristic. Its passband 120 is tuned across the various WDM channel carrier signals 121 in the spectrum of the WDM signal 112 during a scan.

Returning to FIG. 1, the tuning of the tunable filter 116 converts the spectrum of the WDM signal 112 into a time series, which is detected by detector 124.

Other configurations of the spectrum detection subsystem are used in other embodiments. For example, in diffractive based systems, the spectrum is distributed spatially. This distribution is then detected with a detector array, typically.

In the illustrated example, a reference source system is also provided. Specifically, a super luminescent light emitting diode 128 generates a broadband signal that is converted into a reference signal by a fixed etalon 130 and then coupled into the tunable filter 116 by a fold mirror 131 and a fixed filter 113. This signal is then detected by the detector system 124. Because of the stable spectral characteristics, the reference signal is used to determine the absolute location of the passband 120 of the tunable filter 116.

The output of the detector 124 is amplified by amplifier 132. Intervening filtering stages are preferably provided for signal conditioning, as shown. Presently, a logarithmic amplifier is used.

The present system is designed to operate over a very wide dynamic range. For example, for one specification, it must receive and analyze signals having powers between 0 dBm to −60 dBm.

In the past, to cover such a wide dynamic range, a linear amplifier was used with a programmable gain stage. The gain was selected to use the dynamic range available from the analog-to-digital converter. While using a stable linear amplifier, the gain adjustment can require successive scans to find the proper gain setting.

Figure 3:
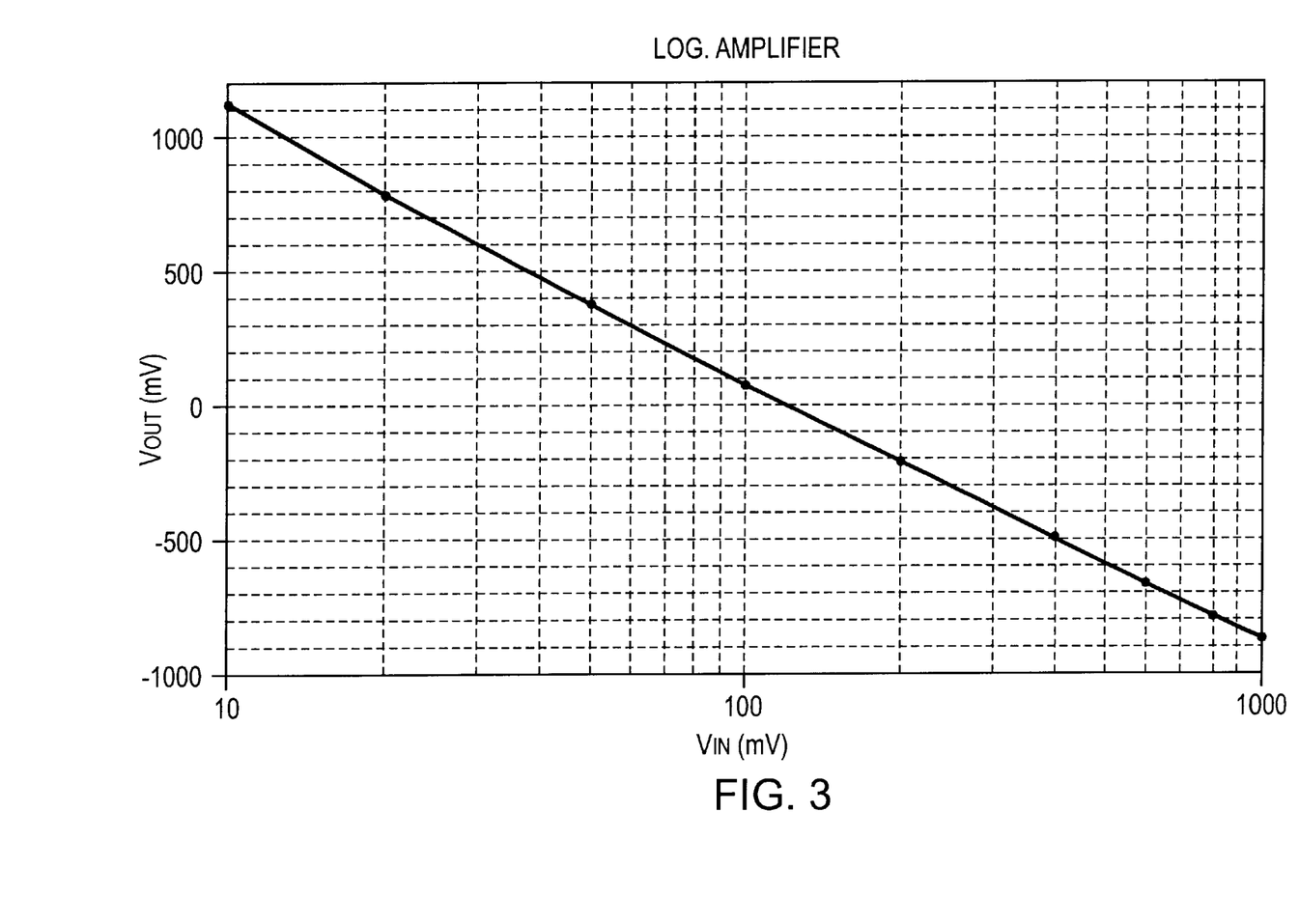
FIG. 3 is a plot of output voltage as a function of input voltage illustrating the operation of the logarithmic amplifier.

The operation of the logarithmic amplifier is illustrated in the plot of FIG. 3.

Specifically, the output voltage Vout varies as the log of the input voltage Vin. This allows the single amplifier-A/D system to cover a large dynamic range without requiring gain adjustment.

One problem associated with log amplifiers, however, can be a temperature dependence. This can make the system inaccurate, unless well temperature compensated commercial devices are available.

In one implementation, the log amplifier 132 is directly installed on the optical bench 108, and the optical bench 108 is temperature controlled by a thermoelectric cooler 134 in combination with a temperature detector, such as a thermocouple or thermistor 136. As a result, since the log amplifier is temperature-controlled and preferably within a surrounding hermetic package 138, the log amplifier's gain is stable over time and environmental operating conditions.

Returning to FIG. 1, the output of amplifier 104 is converted into sample data by the analog-to-digital converter 104. Presently, a 16 bit converter is used. These sample data are provided to a digital processor 140. Specifically, in one implementation, using an Analog Devices SHARC-brand signal processor, the sample data are received at a serial port, termed a SPORTx port. These sample data are then transferred to the processor's memory 142. In the SHARC implementation, the memory is divided into two blocks, block 0, block 1.

The signal processor 140 further comprises a DSP core 146. This block includes the floating-point and arithmetic logic units of the processor 140, and typically controls or arbitrates access to the internal buses. The signal processor communicates off-chip via data/address bus interface 145. The data/address buses connect the processor 140 to the system memory 144, flash memory 147, and a physical-layer interface controller 148, which is. implemented as an FPGA, in some examples.

The system memory 144 is currently SDRAM (synchronous dynamic random access memory). The flash memory contains the system's firmware and the processing programs executed by the processor 146. The physical-layer interface controller 148 relays data between the system bus and the system's interfaces.

The illustrated configuration has four interfaces: 1) a dual port RAM 149; 2) an RS232 port 150; 3) a USB (universal serial bus) 152; and 4) Ethernet port, i.e., EEE 802.3 standard CSMA/CD (Carrier Sense Multiple Access with Collision Detection) based interface 153. Any of these interfaces supports the communication between a host computer 155 and the data processing subsystem 106.

The data processing subsystem 106 further comprises a second analog to digital converter for diagnostic purposes. For example, the diagnostic A/D converter 160 samples the filter voltage and output from the temperature detector 136 and provides temperature data to the processor 140 for control of the cooler 134.

Two digital to analog D/A converters are also provided for control of the spectrum detection subsystem 102. Specifically, a filter D/A 162 is used to drive the filter 116 through electronic filtering and gain signal conditioning stages. A SLED D/A 164 is used to drive the source 128 through a voltage to current conditioning stage.

Figure 4:
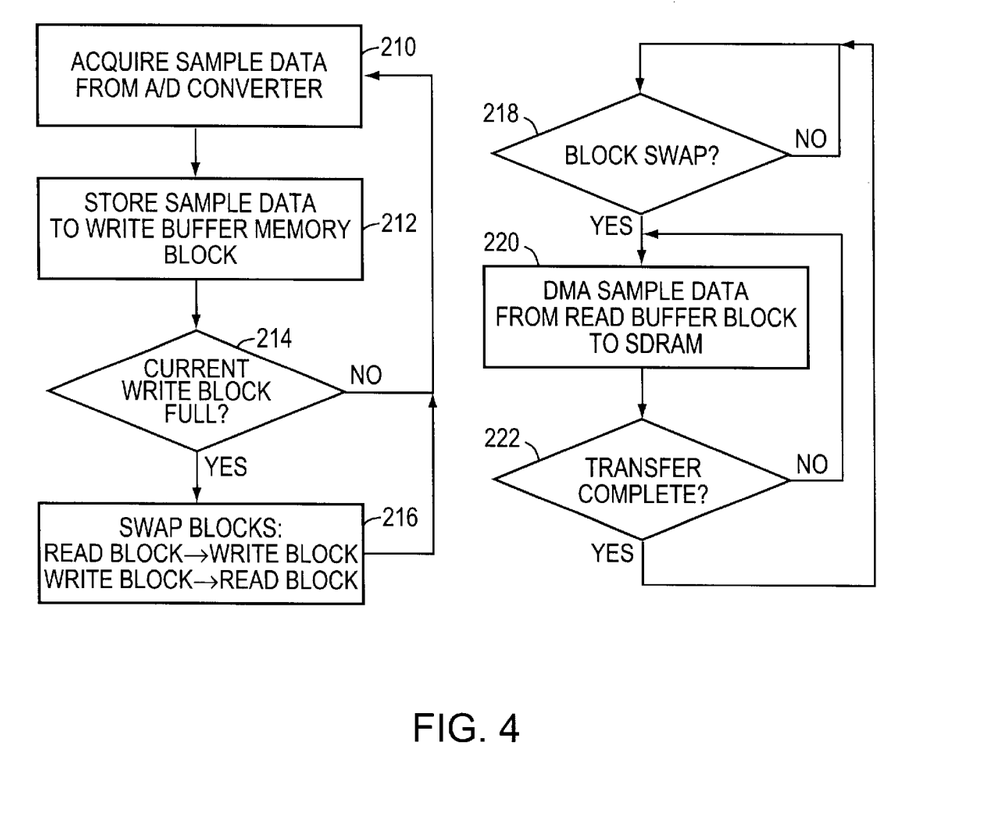
FIG. 4 is a flow diagram illustrating the ping-pong buffer's movement of sample data from the analog to digital converter to system memory.

FIG. 4 illustrates use of the processor memory 142 as a ping-pong buffer to transfer the sample data from A/D 104 to the system memory 144.

Some background may be useful. Ping-pong buffers are a specialized form of FIFO (First-In, First-out) queue that divides a block of storage into two equal halves. One half (the write buffer) is generally always available for writing, and the other half (the read buffer) is generally emptied in one continuous operation. When the write buffer fills, the block is converted to the read buffer and thus now available for reading. Ping-pong buffers are similar to ring or circular buffers in that data are written to them so long as the corresponding reads empty the buffers before they fill.

According to the present implementation, sample data are acquired from the analog-to-digital converter 104 in step 210 by the DSP 140 via the SPORTx port. The data are then stored to the memory block of the processor memory 142 that is currently designated as the write buffer in step 212. This continues until it is determined that the write block is filled in step 214. When it is full, the read and write blocks are swapped in step 216, and the next data are acquired and stored.

Then, upon the detection of a block swap in step 218, a DMA (direct memory access) operation is performed to transfer the sample data in the new read block to the system memory 144. Specifically, in step 220, the sample data are DMAed from the read block to the system memory 144. This continues until it is determined that the transfer is complete in step 222. This DMA process does not consume many of the instruction cycles of the DSP core 146, thus freeing the DSP core to begin operations on the sample data that are now stored in the system memory 144.

Figure 5:
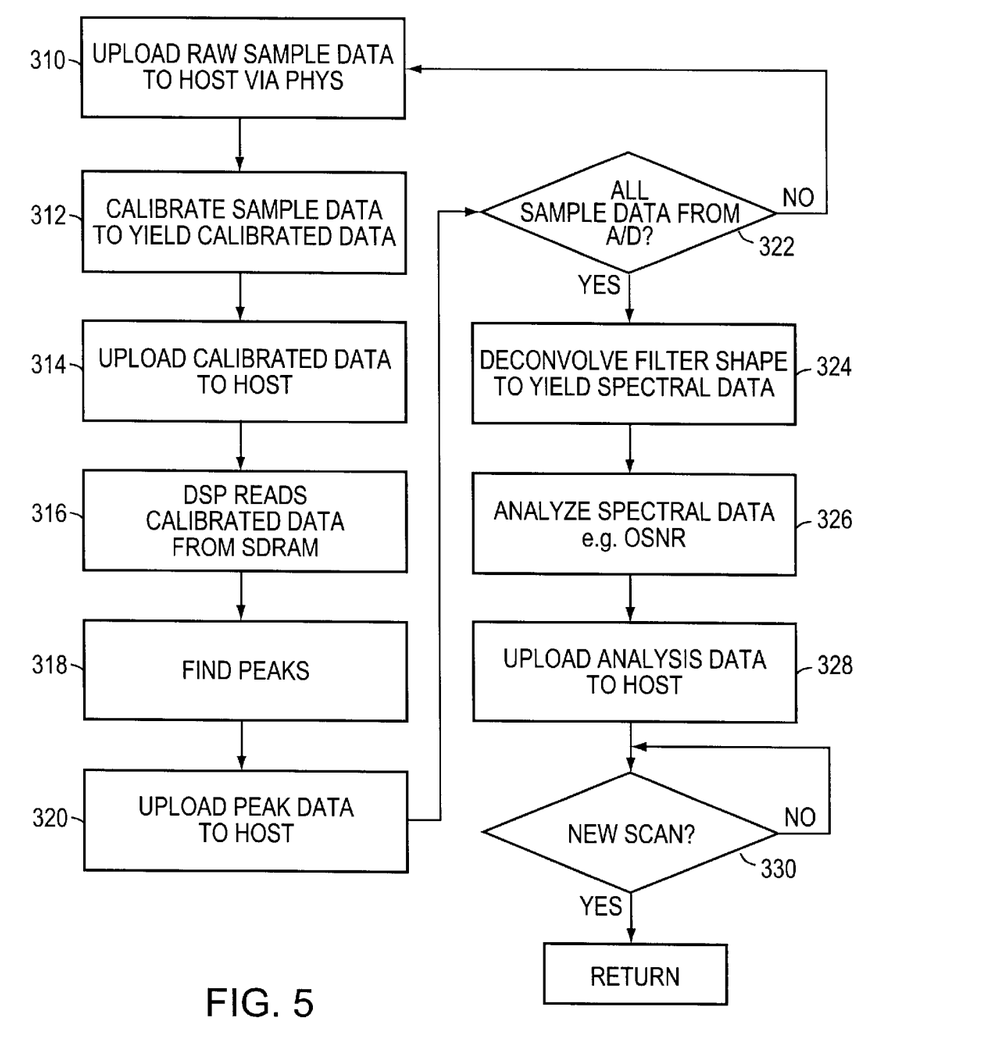
FIG. 5 is a flow diagram showing the fast peak reporting performed by the present invention.

FIG. 5 shows the processing performed by the DSP core 146. This processing is performed by the DSP 140 even while the data are being off-loaded from the analog-to-digital converter 104 to the processor memory 142 and data transferred from the processor memory 142 to the system memory 144. The ability to execute this co-processing is driven by the relative slowness of the data upload from the A/D converter 104. Data transfer from the A/D converter 104 can be 10 times slower than other data transfers in the system.

For example, in one embodiment, the data are serially uploaded from the A/D converter 104 based on its sampling rate of 1 Mega samples per second (MS/sec) in one embodiment, whereas sample data are transferred between the processor memory 142 and the system memory at 16 MB/sec, for example. Thus, the sample data upload to the host, the peak finding, and peak data upload described below in steps 310 to 322 occur while the data are being acquired from the same filter scan.

According to an embodiment of the present invention, steps 310–322 are performed as each block of sample data is transferred in the ping-pong buffer operation of the processor memory 142. In more detail, in step 310, the new block of raw sample data that has just been loaded into the system memory 144 is uploaded to the host 155 via the phys 148.

Figure 6:
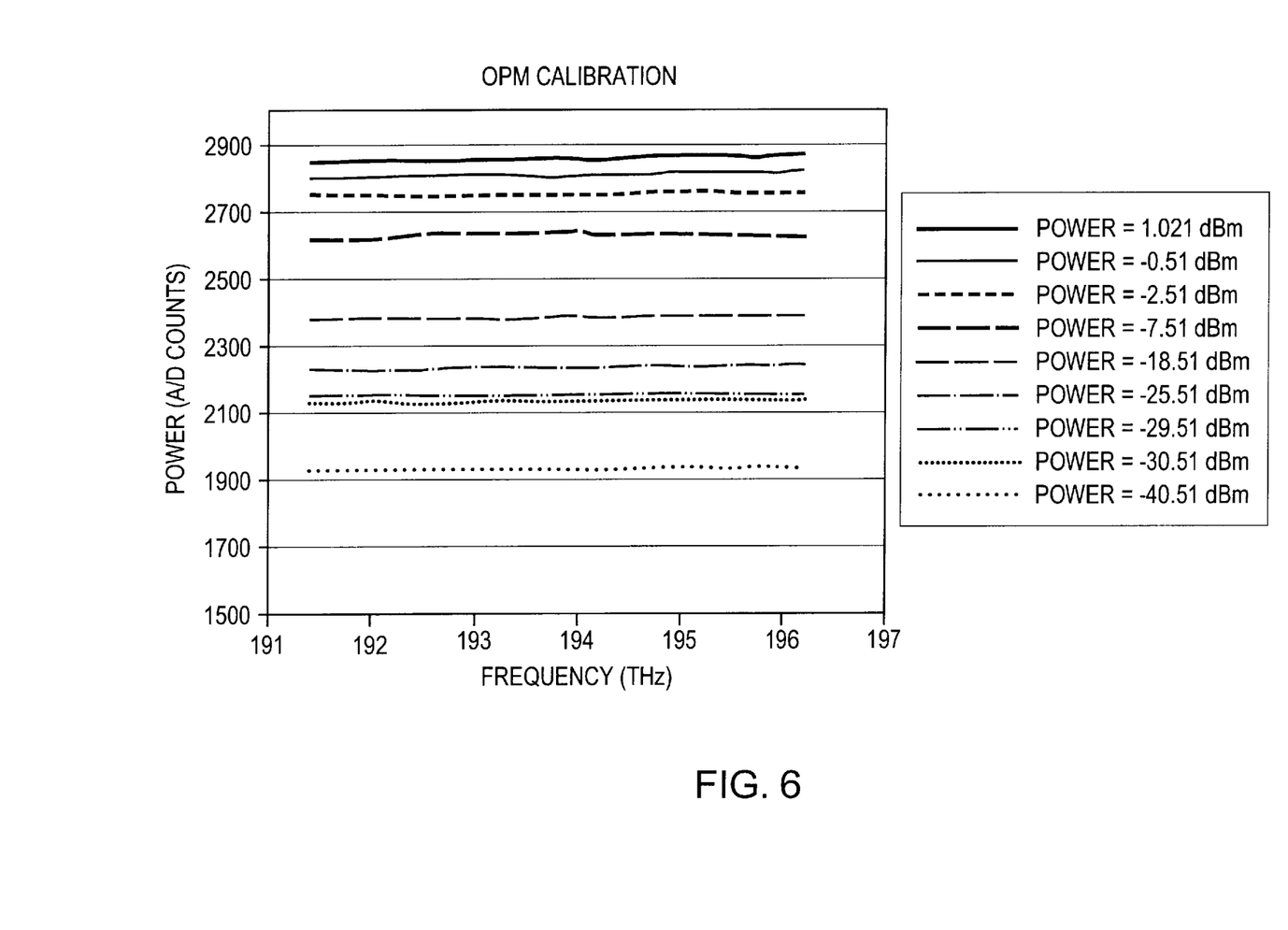
FIG. 6 is a plot of power-calibration data as a function of frequency.

Then, the DSP 140 calibrates the sample data to yield calibrated data in step 312. This operation is explained with reference to FIG. 6. Specifically, power correction factor, measured in counts of the analog-to-digital converter, is stored by the system in flash memory 147, for example, as a function of frequency. These data are used to correct for an apparent change in power to the input signal level over the frequency response of the device 100. This is used to calibrate the sample data that is directly measured by the analog-to-digital converter 104.

Returning to FIG. 5, the calibrated data from the new block, which have not been previously uploaded, are then uploaded to the host 155 in step 314. DSP 140 then reads the new calibrated data from the system memory 144 in step 316. It applies a peak finding algorithm to determine the frequency at which peaks are present in the calibrated data in step 318. The peak finding is performed on the uncalibrated sample data in other embodiments.

Figure 7:
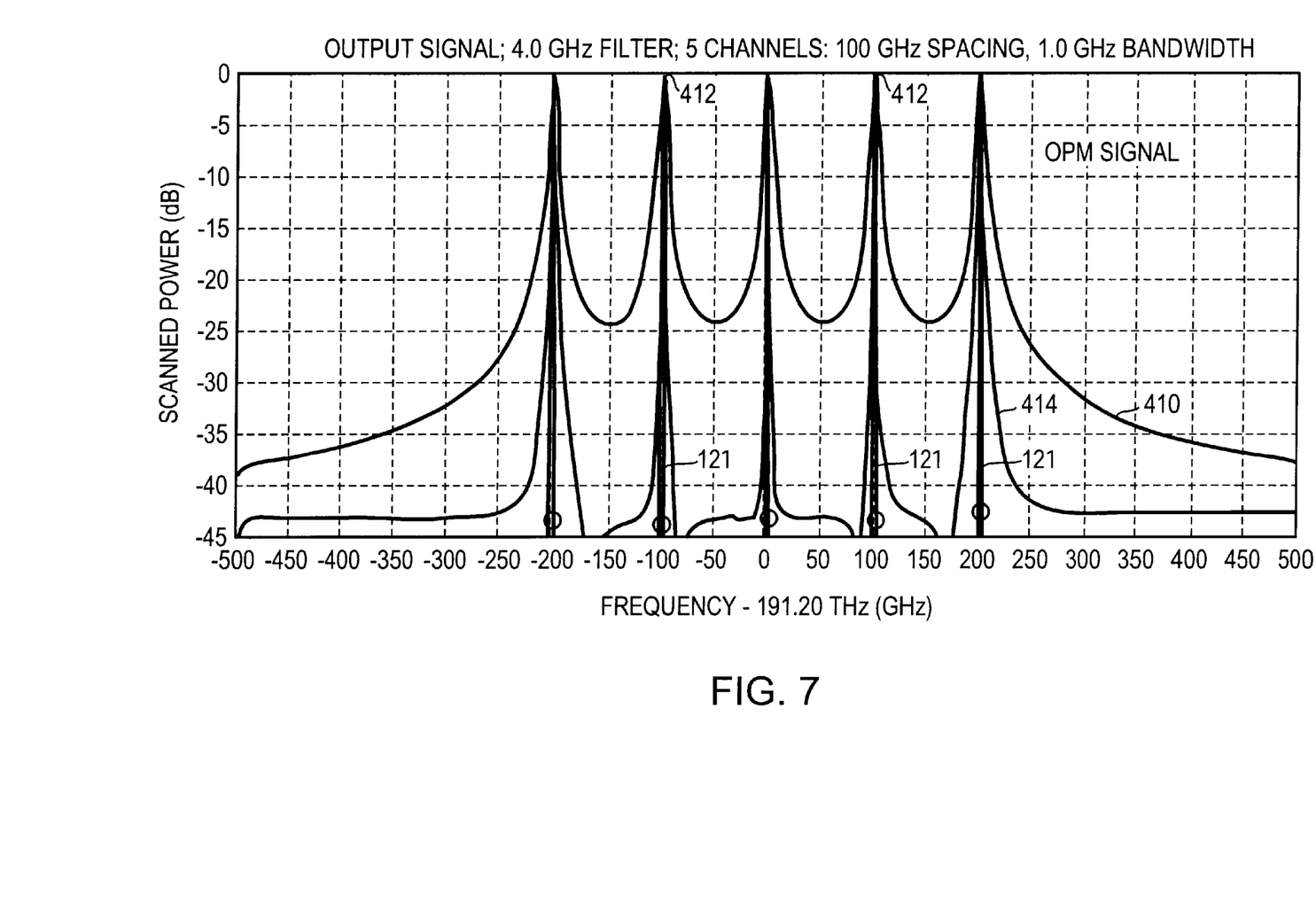
FIG. 7 is a plot of sample data, a WDM signal, and a corrected spectrum data generated by the present invention.

The peak finding process is illustrated in FIG. 7. Specifically, the new block of calibrated data 410 is scanned to locate the frequency of peaks 412. Once these peaks in the data are discovered by the processing of the DSP core 146, the peak information, including both frequency and the power of each peak, is then uploaded to the host 155 in step 320.

The following is a C implementation of a peak finding algorithm. The main function is DetectPeakDB( ), which finds the peaks in the raw data. The use of the two tracking counters: numOfSpecProcessed and numOfSpecAcquired, enables the peak-finding even before an entire data set has been received.

```
/* peakPick.c - locate peak in the spectral data */
#include "peakPick.h"
#define GetSpecSample(sampleNum) ((((sampleNum)%2)>0)?
(spectralDB[(sampleNum)/2]>>16):(spectralDB[(sampleNum)/2]&0xFFFF))
#define MAX_SPEC_SAMPLE 100000
#define MAX_NUM_PEAK 400
#define RIGHT_VALLEY 0
#define LEFT_VALLEY 1
#define TOT_VALLEY 2
//spectral A2D data - 16-bit resolution
int spectralDB[MAX_SPEC_SAMPLE/2];
int lastProcessedSampleNum = 0;
int thresholdDB = 5; //minimum difference between peak and valley in DB
int minChanSpacing = 12.5; //GHz 400 channels in 5 THz range
int numOfSpecAcquired = 0; //Total number of spectral data acquired
int numOfSpecProcessed = 0; //The current spectral data being processed
int numOfSampleInHalfMinChanSpace = 0; //Number of data points in half minimum channel
spacing
```

```
-continued int peakToValleyLimit = 0; //The limit between peak and valley < 4 times minimum channel
spacing
int freqRange = 5000; //GHz
int numOfPeaks = 0;
int peakIdx[MAX_NUM_PEAK];
int valleyListIdx[MAX_NUM_PEAK];
int valleyIdx[MAX_NUM_PEAK][TOT_VALLEY];
//local data
static int findLeftOrRightValley = RIGHT_VALLEY; //0 - find right valley, 1 - find left
valley
static int specMaxIdx = 0;
static int specRightIdx = 0;
static int specLeftIdx = 0;
static int specMaxDBVal = 0;
static int specRightDBVal = 0;
static int specLeftDBVal = 0;
/******************************************************************/
void InitDetectPeakDB(void) {
    numOfSpecAcquired = 0;
    numOfSpecProcessed = 0;
    findLeftOrRightValley = RIGHT_VALLEY;
    specMaxIdx = 0;
    specRightIdx = 0;
    specLeftIdx = 0;
    //least number of samples in half the minimum channel spacing
    numOfSampleInHalfMinChanSpace =
0.5 *MAX_SPEC_SAMPLE/(freqRange* 1.0/minChanSpacing);
    //maximum number of samples between peak and valley in one channel
    peakToValleyLimit = 8 * numOfSampleInHalfMinChanSpace;
    numOfPeaks = 0;
    memset(peakIdx, 0, MAX_NUM_PEAK*sizeof(int));
    return;
}
/******************************************************************/
void DetectPeakDB(void) {
    int i, specDBVal;
    int disLeft, disRight;
    int idxLeft, idxRight, idxMax;
    for(i = numOfSpecProcessed; i < numOfSpecAcquired; i++) {
        specDBVal = GetSpecSample(i);
        //find the right valley
        if(findLeftOrRightValley == RIGHT_VALLEY && specDBVal <=
specRightDBVal) {
            specRightDBVal = specDBVal;
            specRightIdx = i;
        }
        //find the maximum
        if(specDBVal > specMaxDBVal) {
            specMaxDBVal = specDBVal;
            specMaxIdx = i;
            specLeftIdx = i;
            specLeftDBVal = specDBVal;
        }
        //switch to find left valley
        if(findLeftOrRightValley == RIGHT_VALLEY
            && (specRightIdx - specMaxIdx) >
numOfSampleInHalfMinChanSpace
            && (specMaxDBVal - specRightDBval) > thresholdDB ) {
            findLeftOrRightValley = LEFT_VALLEY;
            specLeftIdx = specMaxIdx;
            specLeftDBVal = specMaxDBval;
    }
        //find the left valley
        if(findLeftOrRightValley == LEFT_VALLEY && specDBVal <=
specLeftDBVal) {
            specLeftDBVal = specDBVal;
            specLeftIdx = i;
        }
        //found a peak and setup to find the next peak;
        if(findLeftOrRightValley == LEFT_VALLEY
            && (specMaxIdx - specLeftIdx) > numOfSampleInHalfMinChanSpace
            && (specMaxDBVal - specLeftDBVal) > thresholdDB) {
            peakIdx[numOfPeaks] = specMaxIdx;
            valleyListIdx[numOfPeaks] = specRightIdx;
            numOfPeaks++;
            findLeftOrRightValley = RIGHT_VALLEY;
            specRightIdx = specLeftIdx;
            specRightDBVal = specLeftDBVal;
            specMaxIdx = specLeftIdx;
```

```
            specMaxDBVal = specLeftDBVal;
            //Find the left valley and right valley idx for previous peak
            if(numOfPeaks > 1) {
                //balance the left and right valley
                idxRight = valleyListIdx[numOfPeaks-2];
                idxLeft = valleyListIdx[numOfPeaks-1]
                idxMax = peakIdx[numOfPeaks-2];
                disLeft = idxMax - idxLeft;
                disRight = idxRight - idxMax;
                if(disRight > disLeft)
                    idxRight = idxMax + disLeft;
                else
                    idxLeft = idxMax - disRight;
                //limit the valley to be at certain distance away from the peak
                disLeft = idxMax - idxLeft;
                if(disLeft > peakToValleyLimit) {
                    idxLeft = idxMax - peakToValleyLimit;
                    idxRight = idxMax + peakToValleyLimit;
                }
                valleyIdx[numOfPeaks-2][RIGHT_VALLEY] = idxRight;
                valleyIdx[numOfPeaks-2][LEFT_VALLEY] = idxLeft;
            }
        }
    }
    return;
}
```

The end of the scan is determined in step 322, when all of the sample data have been acquired and no more blocks are waiting to be transferred into system memory 144 from the processor memory 142. In a current implementation, steps 310–322 are performed for each block transfer. Thus, processing typically waits at step 322 until a new block is present in the system memory 144. In short, the processing of steps 310–322 for a block occurs in less time than is required to transfer a data block from the A/D 104 to the system memory.

In one embodiment, the peak data for the complete scan are available to the host computer 155 within less than 0.1 seconds from the end of the scan.

The more complex processing operations requiring a complete data set are then performed. Specifically, in step 324, the filter shape 120 is deconvolved to yield spectral data 414, see FIG. 7. This deconvolution is useful because of the tails in the Lorentzian pass band 120 of the specific tunable filter 116, which is used in one implementation. Deconvolution is not required to find the peaks, but is important to assess the spectral shapes of the channels 122 and the exact power level of the channel carriers 120 in the WDM signal 112.

Further processing is then performed based on the corrected spectral data 114. Specifically, in step 326, in one implementation, spectral analysis is performed such as calculation of the optical signal-to-noise ratio. This analysis data including the OSNR and the spectral data is then uploaded to the host in step 328. Then the system waits for a command to perform another scan in step 330.

While this invention has been particularly shown and described with references to preferred embodiments thereof, it will be understood by those skilled in the art that various changes in form and details may be made therein without departing from the scope of the invention encompassed by the appended claims.

What is claimed is:

1. An optical spectrum monitoring system, comprising:
  a spectrum detection subsystem for providing an electrical signal corresponding to a spectrum of an optical signal;
  an analog to digital converter for converting the electrical signal into sample data; and
  a data processing subsystem that detects peaks in the spectrum using the sample data and uploads peak information to a host computer before performing processing to determine the shape of the peaks and/or noise information for the optical signal.

2. An optical spectrum monitoring system as claimed in claim 1, wherein the data processing subsystem detect spectral locations of the peaks in the spectrum.

3. An optical spectrum monitoring system as claimed in claim 1, wherein the spectrum detection subsystem comprises a tunable MEMS filter.

4. An optical spectrum monitoring system as claimed in claim 1, wherein the spectrum detection subsystem comprises a reference source for calibrating the spectrum detection subsystem.

5. An optical spectrum monitoring system as claimed in claim 1, wherein the data processing subsystem uploads the sample data to the host computer before uploading the peak information to the host computer.

6. An optical spectrum monitoring system as claimed in claim 1, wherein the data processing subsystem begins detecting the peaks before completion of the conversion of the spectrum into the sample data.

7. An optical spectrum monitoring system as claimed in claim 1, wherein the data processing subsystem comprises:
  a processor that includes processor core and at least two blocks of processor memory; and
  system memory, the blocks of processor memory being used as a ping-pong buffer to transfer sample data from the analog to digital converter to the system memory.

8. An optical spectrum monitoring system as claimed in claim 7, wherein the sample data in the processor memory is transferred to the system memory using a direct memory access operation while the processor core generates the peak information.

9. An optical spectrum monitoring system as claimed in claim 1, wherein the data processing subsystem generates calibrated sample data from the sample data in response to calibration information and uploads the calibrated sample data to the host computer.

10. An optical spectrum monitoring system as claimed in claim 1, wherein the data processing subsystem deconvolves a filter transfer function from the spectrum of the sample data to generate a corrected spectrum.

11. A method for processing spectrum information in an optical spectrum monitoring system, the method comprising:

detecting a spectrum of an optical signal;

converting the spectrum into sample data;

detecting peaks using the sample data;

uploading peak information to a host computer; and after at least beginning the step of uploading the peak information, determining a shape of the peaks and/or noise information for the optical signal.

12. A method as claimed in claim 11, wherein the step of detecting the spectrum comprises tuning a passband of a tunable filter across the spectrum and detecting a level of an optical signal transmitted through the tunable filter.

13. A method as claimed in claim 11, further comprising calibrating the sample data in response to calibration information.

14. A method as claimed in claim 11, further comprising uploading the sample data to the host computer before uploading the peak information to the host computer.

15. A method as claimed in claim 11, further comprising beginning the step of detecting the spectral locations of the peaks before completion of the step of converting the spectrum into the sample data.

16. A method as claimed in claim 11, further comprising transferring sample data between a processor and system memory using direct memory access to enable generation of the peak information by a processor core.

17. A method as claimed in claim 11, further comprising:

generating calibrated sample data from the sample data in response to calibration information; and uploading the calibrated sample data to the host computer.

18. A method as claimed in claim 11, further comprising deconvolving a filter transfer function from a spectrum of the sample data to generate a corrected spectrum.

19. An optical spectrum monitoring system, comprising:

a spectrum detection subsystem for providing an electrical signal corresponding to a spectrum of an optical signal;

an analog to digital converter for converting the electrical signal into sample data; and a data processing subsystem that detects peaks in the spectrum using the sample data and uploads peak information to a host computer before completion of the conversion of the spectrum into the sample data.

20. A method for processing spectrum information in an optical spectrum monitoring system, the method comprising:

detecting a spectrum of an optical signal;

converting the spectrum into sample data;

detecting peaks using the sample data; and uploading peak information to a host computer before completion of the step of converting the spectrum into the sample data.

* * * * *